3,259,649
CARBONYLATION OF ALPHA-HALOEPOXIDES
James D. McClure, San Francisco, Calif., assignor to Shell Oil Company, New York, N.Y., a corporation of Delaware
No Drawing. Filed Apr. 29, 1963, Ser. No. 276,218
5 Claims. (Cl. 260—484)

This invention relates to a process for the carbonylation of epoxides. More particularly, it relates to a process for the carbonylation of alpha-haloepoxides.

The carbonylation of olefins, and to a lesser degree the carbonylation of opoxides, is well known in the art. The products of such processes are largely determined by the reaction conditions, and the type of other reactants present. One such modification, the carbonylation of olefins with carbon monoxide in the presence of hydrogen has found extensive utilization in the well-known Oxo process for the production of aldehydes and alcohols. Related carbonylation processes in the presence of water, amines, or alcohols, result in the formation of acids, amides, and esters. When the material to be carbonylated contains halogen substituents, greater difficulties are attendant to the carbonylation process. While the presence of a halogen substituent considerably removed from the site of carbonylation appears to have no detrimental effect, carbonylation of an olefin wherein the halogen substituent is vinylic or allylic frequently results in the loss of halogen during the carbonylation process. Thus, in the presence of nickel carbonyl catalyst, allyl chloride is converted to 3-utenoic acid and crotyl chloride to 4-pentenoic acid. The halide ion removed during the carbonylation process creates further difficulty through reaction with the catalyst, thereby decreasing the catalyst efficiency.

It is an object of this invention to provide an improved process for the carbonylation of epoxides. A more specific object is to provide a process for the carbonylation of alpha-haloepoxides wherein the resulting product retains the halogen substituent. A further object is the provision of a process for the carbonylation of alpha-haloepoxides in the presence of alcohols to produce γ-halo-β-hydroxyalkanoic acid esters.

These objects are accomplished by the process of the present invention in which alpha-haloepoxides are reacted with carbon monoxide in alcoholic solution in the presence of a metal carbonyl carbonylation catalyst, preferably in alcohol-inert diluent solution.

The alpha-haloepoxide reactant of the present invention is a m, n-epoxy-o-haloalkane wherein m, n and o are consecutively numbered carbon atoms of the alkane moiety. Preferred reactants of this class contain only carbon and hydrogen besides the epoxy-oxygen and the single halogen atom, and possess a terminal epoxy linkage. More preferred are the alpha-haloepoxides represented by the formula

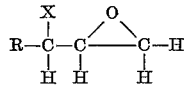

wherein R is hydrogen or alkyl and X is halogen. Preferred alkyl R groups have from 1 to 6 carbon atoms and preferred halogen substituents are halogens having an atomic number from 17 to 35, that is, the middle halogens, bromine and chlorine. Best results are obtained and the most useful products are prepared when the alpha-haloepoxide is an epihalohydrin, that is, a compound of the above-depicted formula wherein R is hydrogen. Although epifluorohydrin and epiiodohydrin are operable in the process of the invention, as previously stated, the preferred halogen substituents are chlorine and bromine, and optimum utilization of the process of the invention is achieved when epichlorohydrin and epibromohydrin are employed as reactants.

The carbon monoxide reactant may be employed in any convenient form, provided that it is substantially anhydrous. Advantageous use is made of commercially available gaseous carbon monoxide.

The solvent employed in the process of the invention is a mixture of an alcohol and an inert diluent. The alcohol employed serves as co-solvent and also as a reactant, for the particular ester produced is determined by the particular alcohol employed. For example, when epichlorohydrin is carbonylated in the presence of methyl alcohol, methyl 4-chloro-3-hydroxybutyrate is produced. Although it is possible to conduct the carbonylation in the presence of a mixture of alcohols, thereby obtaining a mixture of ester products, little is gained by such a process, and in the preferred modification of the process, only a single alcohol is present. The presence of alcohol is required, however, for the formation of the desired ester product.

It is preferred that the reaction mixture be substantially anhydrous, as the presence of moisture promotes ring opening of the epoxy reactant. Although small amounts of moisture, e.g., up to about 1–2% of the solvent mixture, can be tolerated provided that excess epoxy reactant be employed, it is preferred that the alcohol and the solvent mixture prepared therefrom be substantially anhydrous.

Although monohydroxylic alcohols are in general satisfactory in the process of the invention, best results are obtained when the alcohol employed is a primary aliphatic alcohol, preferably a primary alkanol having from 1 to 8 carbon atoms. Illustrative of such preferred alkanols are methanol, ethanol, n-propanol, n-butanol, iso-butanol, n-hexanol, n-octanol, 2-ethylhexanol and the like. Most preferred are primary alcohols having from 1 to 4 carbon atoms with methanol providing the optimum utilization of the process of the invention.

Polyhydric alcohols, e.g., lower alkanediols, and corresponding ether alcohols, e.g., lower alkoxy alkanols such as methoxy ethanol, are also useful.

The inert diluent employed in the process of the invention as co-solvent is liquid at reaction temperature and pressure and contains no active hydrogen atoms. Exemplary inert diluents include internal oxahydrocarbons, e.g., ethers such is diethyl ether, dibutyl ether, propyl hexyl ether, dimethoxyethane and the dimethyl ether of diethylene glycol, as well as cyclic ethers such as dioxane, tetrahydrofuran and tetrahydropyran; ketones such as ethyl propyl ketone, methyl isobutyl ketone and cyclohexanone; and perhalocarbons such as carbon tetrachloride and perfluoropropane. Preferred inert diluents to be employed as co-solvents, however, are the hydrocarbons.

The hydrocarbons employed as co-solvent are aliphatic, aromatic, or cycloaliphatic and are liquid at the reaction temperature and pressure. Illustrative aliphatic hydrocarbons are pentane, hexane, octane, isoctane, decane and the like; while cycloaliphatic hydrocarbons include cyclohexane, cyclopentane, methylcyclohexane, and decalin; and aromatic hydrocarbons include benzene, toluene, xylene, and ethylbenzene; as well as mixtures thereof.

The carbonylation solvent is prepared by mixing the alcohol and the inert diluent. While a particular alcohol-inert diluent ratio is not critical, an excessive proportion of alcohol increases the probability of alcohol reacting directly with the haloepoxide with resulting loss of reactants and lowering of product yield. Alternatively, however, a ratio too high in inert diluent results in a substantially diminished rate of reaction with no apparent compensating advantage. In general, ratios of alcohol to inert diluent of from about 10:1 to about 1:2 are satisfactory, while ratios of from about 5:1 to about 1:1 are preferred.

Best results are obtained when the alcohol is present in molar excess over the haloepoxide reactant. Molar ratios of alcohol to epoxide of up to about 20:1 are satisfactory, with ratios of alcohol to haloepoxide of from about 2:1 to about 10:1 preferred.

The catalysts employed in the process of the invention are conventional carbonylation catalysts. These catalysts are customarily complexes of transition metals, particularly transition metals of Group VIII of the Periodic Table, wherein the metal is complexed with stabilizing ligands. While complexes can be prepared from metals such as iron and nickel, best results are obtained when the carbonylation catalyst is a complex of cobalt. By stabilizing ligand is meant a ligand capable of donating an electron pair to the metal, and simultaneously having the ability to accept electrons from the metal, thereby imparting stability to the resulting complex. Examples of such ligands are carbon monoxide molecules and tertiary phosphine molecules. The cobalt carbonylation catalysts of the present invention contain one or more carbon monoxide molecules within the complex, and preferably contain from 3 to 4 molecules of carbon monoxide per atom of cobalt. A particularly useful catalyst is dicobalt octacarbonyl. It is equivalently useful, and in many instances to be preferred, to employ a modified dicobalt octacarbonyl catalyst wherein one to two of the carbon monoxide ligands of the dicobalt octacarbonyl complex have been replaced by tertiary phosphine ligands. Preferably such modified cobalt carbonylation catalysts contain three carbon monoxide molecules and one tertiary phosphine molecule for each cobalt atom present in the complex, e.g., a bis(tertiary phosphine) dicobalt hexacarbonyl.

The preferred modified cobalt carbonyl carbonylation catalysts are represented by the formula $$(RRRP)_2Co(CO)_6$$

wherein R is alkyl, preferably having from 1 to 10 carbon atoms, or aryl, preferably having from 6 to 10 carbon atoms. Such modified cobalt carbonyl carbonylation catalysts are illustrated by Bis(tri-n-butylphosphine) dicobalt hexacarbonyl,
Bis(triethylphosphine) dicobalt hexacarbonyl,
Bis(dimethylhexylphosphine) dicobalt hexacarbonyl,
Bis(triphenylphosphine) dicobalt hexacarbonyl,
Bis(tribenzylphosphine) dicobalt hexacarbonyl,
Bis(dimethylbenzylphosphine) dicobalt hexacarbonyl,
(Diethylphenylphosphine) (tri-n-butylphosphine) dicobalt hexacarbonyl,
(Dihexylphenylphosphine) (tridecylphosphine) dicobalt hexacarbonyl and the like.

The modified cobalt carbonyl carbonylation catalysts may be utilized in a variety of ways. Frequently the catalysts are introduced as performed materials into the reaction mixture. Alternatively, however, the catalysts may be prepared in situ, as for example, by adding to the reaction mixture dicobalt octacarbonyl and tertiary phosphine. Initial reaction produces the modified catalyst which then serves to catalyze the carbonylation of the haloepoxide reactant.

Best advantage is taken of the process of the invention when the carbonylation is conducted in the presence of a co-catalyst. Co-catalysts found to be suitable in the process are quaternary ammonium salts, wherein one of the substituents of the tetravalent nitrogen atom is epoxyalkyl. Preferred co-catalysts are those wherein one radical attached to the nitrogen atom corresponds to the radical formed by removal of the halogen substituent from the haloepoxide whose carbonylation is desired and are quaternary ammonium halides, particularly those halides wherein the halogen has an atomic number from 17 to 53, that is, the halogens bromine, chlorine, and iodine. Thus, best results in the carbonylation of epichlorohydrin are obtained in the presence of a glycidyl-substituted quaternary ammonium halide. The remaining valences of the tetravalent nitrogen atom are preferably satisfied with alkyl radicals, including aralkyl radicals, especially those alkyl radicals having from 1 to 12 carbon atoms. Examples of suitable co-catalysts include Glycidyltrimethylammonium chloride,
Glycidyltrimethylammonium bromide,
Glycidylpyridinium chloride,
Glycidyltrioctylammonium iodide,
Glycidyltriethylammonium fluoride,
Glycidyldiethyllaurylammonium bromide,
1-(2,3-epoxybutyl)tripropylammonium chloride,
3-(4,5-epoxyoctyl)tributylammonium chloride, and
Glycidyldimethylbenzylammonium bromide.

The co-catalyst may be added to the reaction mixture as a preformed material, although it is also useful to prepare the co-catalyst in situ, as by adding to the reaction mixture a tertiary amine or a tetraalkylammonium halide, either of which forms the desired epoxyalkyltrialkylammonium halide co-catalyst by reaction with the haloepoxide reactant. For example, in the carbonylation of epibromohydrin addition to the reaction mixture of compounds such as trimethylamine or tetramethylammonium bromide serves to form in situ glycidyltrimethylammonium bromide which functions as the co-catalyst.

Only catalytic quantities of catalyst and co-catalyst are required. Satisfactory amounts of cobalt carbonyl carbonylation catalyst vary from 0.0001 to about 0.1 mole of catalyst per mole of haloepoxide, with amounts from about 0.005 to about 0.05 mole per mole of haloepoxide being preferred. Although the co-catalyst is preferably employed in amounts equivalent to or in molar excess over the molar amount of catalyst employed, molar ratios of co-catalyst to catalyst from about 1:4 to about 8:1 are satisfactory. Best results are obtained when the molar ratio of co-catalyst to catalyst is from about 1:2 to about 4:1.

The advantages gained by employing a co-catalyst in the carbonylation process are manifested in a lower pressure requirement for successful carbonylation, or in higher yields of product under corresponding reaction conditions. Frequently, a reaction wherein co-catalyst is employed provides yields of desired product from two to three times as great as when carbonylation is conducted under similar conditions of temperature and pressure, but in the absence of co-catalyst.

The carbonylation reaction is customarily conducted by charging to an autoclave or similar reactor the reactants, solvent mixture, catalyst and co-catalyst if co-catalyst is employed. The reactor is flushed with an inert gas, e.g., nitrogen, argon or helium, pressurized with carbon monoxide, and heated to the desired reaction temperature. Best results are obtained when the reaction mixture is agitated during the course of reaction, as by rocking or shaking the reactor.

The optimum reaction conditions are dependent upon several factors. Conditions that are overly severe, although resulting in high conversions of reaction, also promote side reactions that result in the formation of undesirable products, thereby resulting in lowered yield and complication of product recovery. Alternatively, reaction conditions that are too mild result in diminished rates of reaction which may render the process commercially unattractive. In general, temperatures from about 50° C. to about 150° C. are suitable, while temperatures from about 65° C. to about 120° C. are preferred. The carbon monoxide pressure is for convenience measured at the time of pressurization of the reactor, that is, at or near room temperature, e.g., 20–30° C. The reactor pressure will of course increase as the reactor is heated.

Suitable reaction pressures vary from about 500 p.s.i. to about 10,000 p.s.i., although pressures from about 3000 p.s.i. to about 7000 p.s.i. are satisfactory in most cases. Reaction times generally vary from about 1 to about 8 hours.

At the conclusion of reaction, the reactor is cooled and depressurized, and the product is obtained by conventional means, such as by fractional distillation of the residual liquid. The products obtained are alkyl esters of $\gamma$-halo-$\beta$-hydroxyalkanoic acids. For example, 4-chloro-3-hydroxybutyrate esters are obtained from the carbonylation of epichlorohydrin, and 4-bromo-3-hydroxybutyrate esters from carbonylation of epibromohydrin. Such materials contain three reactive functional groups, and are therefore utilized advantageously as chemical intermediates.

The products of the process of the present invention may be hydrolyzed to the free acid, or trans-esterified to produce other useful esters. The halogen substituent may be reacted with tertiary amines to form useful quaternary ammonium salts, or reacted with sodium hydrosulfide to form thiol compounds. Reaction of the hydroxyl group with alkylene oxides produces poly(oxyalkylene) derivatives useful in the production of polyurethane foams. The products may also be converted to ethers by reaction with alkoxides or phenates, or to esters by reaction with carboxylic compounds.

A particularly desirable utilization of the products of the invention results from the conversion of the halohydrin group to an epoxy linkage. Methyl 4-chloro-3-hydroxybutyrate may be converted to methyl 3,4-epoxybutyrate, for example. The epoxy derivatives thus produced may be reacted with alcohols to produce ethers, with carboxylic acids to produce esters, with water to produce diols or with hydrogen sulfide to produce a hydroxythiol. The epoxy esters are further utilized as monomers from which epoxy resins may be produced by curing the epoxy ester with a variety of conventional curing agents.

To further illustrate the process of the invention, the following examples are provided. It should be understood that they are not to be regarded as limitations, as the teachings thereof may be varied as will be understood by one skilled in this art.

*Example I*

To an autoclave were charged 92.5 g. of epichlorohydrin, 7 g. of bis(tri-n-butylphosphine) dicobalt hexacarbonyl, 0.3 g. of glycidyltrimethylammonium chloride, 300 ml. of methanol and 100 ml. of n-hexane. The reactor was flushed three times with nitrogen, pressurized with carbon monoxide to 6000 p.s.i. (measured at 20° C.), and rocking of the autoclave was begun. Absorption of the carbon monoxide by the reaction mixture resulted in a pressure drop of about 300 p.s.i. and the reactor was repressurized to 6000 p.s.i. The reactor was heated to 70° C. and maintained at that temperature for two hours. The reactor was then cooled, vented, flushed with nitrogen, and the product removed and separated from high boiling products by distillation. Analysis of the distillate indicated the presence of 79 g. of methyl 4-chloro-3-hydroxybutyrate which represented a 55% yield. Fractional distillation of the product mixture gave, inter alia, a 71 g. fraction, B.P. 103–104° C. at 10 mm., that analyzed as 98% methyl 4-chloro-3-hydroxybutyrate.

|  | Anal. Calc. for $C_5H_9O_3Cl$ | Found |
|---|---|---|
| Percent C | 39.3 | 39.6 |
| Percent H | 5.95 | 6.02 |
| Percent Cl | 23.3 | 23.5 |
| Ester value, eq./100 g | 0.66 | 0.65 |
| Hydroxyl value, eq./100 g | 0.66 | 0.64 |

Similar results are obtained when an equivalent amount of glycidyltrimethylammonium bromide is employed in place of the glycidyltrimethylammonium chloride.

*Example II*

The procedure of Example I was followed except that dicobalt octacarbonyl was employed as catalyst. Fractional distillation of the product mixture afforded 68 g. of methyl 4-chloro-3-hydroxybutyrate, B.P. 103–104° C. at 10 mm.

*Example III*

To an autoclave were charged 92.5 g. of epichlorohydrin, 7 g. of bis(tri-n-butylphosphine) dicobalt hexacarbonyl, 0.002 mole of glycidyltrimethylammonium bromide, 300 ml. of ethanol and 100 ml. of n-hexane. The reactor was flushed three times with nitrogen and pressurized to 6000 p.s.i. with carbon monoxide. The autoclave was heated to 80° C. and maintained at that temperature for four hours. When reaction was complete, fractional distillation of the reaction mixture gave a fraction of 43 g. of ethyl 4-chloro-3-hydroxybutyrate, B.P. 98–100° C. at 5 mm., which represented a 25% yield.

|  | Anal. Calc. for $C_6H_{11}O_3Cl$ | Found |
|---|---|---|
| Percent C | 43.3 | 43.5 |
| Percent H | 6.67 | 6.80 |
| Percent Cl | 21.3 | 21.1 |
| Hydroxyl value, eq./100 g | 0.60 | 0.61 |
| Ester value, eq./100 g | 0.60 | 0.62 |

*Example IV*

A series of experiments was conducted employing a procedure similar to that of Example I. The reaction conditions were varied, and comparative experiments were made with and without the presence of co-catalyst. The results of these experiments are shown in Table I.

TABLE I

| Catalyst, 1 mole, percent | Co-catalyst, 1 mole, percent | Temp., °C. | Press., p.s.i. at 20° C. | Percent yield |
|---|---|---|---|---|
| $Co_2(CO)_8$ | None | 95 | 6,100 | 21 |
| $[(C_4H_9)_3P]_2Co_2(CO)_6$ | do | 100 | 6,000 | 26 |
| $Co_2(CO)_8$ | (a) or (b) | 80 | 6,000 | 45 |
| $Co_2(CO)_8$ | (c) | 75 | 6,000 | 48 |
| $Co_2(CO)_8$ | (d) | 70 | 5,900 | 50 |
| $[(C_4H_9)_3P]_2Co_2(CO)_6$ | (d) | 70 | 6,000 | 55 |
| $Co_2(CO)_8$ | (d) | 75 | 3,500 | 42 |
| $Co_2(CO)_8$ | None | 110 | 3,200 | 13 | a Glycidyltrimethylammonium chloride.
b Trimethylamine.
c Tetramethylammonium bromide.
d Glycidyltrimethylammonium bromide.

*Example V*

When epibromohydrin is reacted with carbon monoxide in hexanolbenzene solution in the presence of bis(trihexylphosphine) dicobalt hexacarbonyl and triethylamine, good yields of hexyl 4-bromo-3-hydroxybutyrate are obtained.

*Example VI*

When epichlorohydrin is reacted with carbon monoxide in butanol-dioxane solution in the presence of bis(triethylphosphine) dicobalt hexacarbonyl and trimethylamine, good yields of butyl 4-chloro-3-hydroxybutyrate are obtained.

I claim as my invention:

1. The process for the production of 4-halo-3-hydroxybutyrate esters by reacting epihalohydrin with carbon monoxide at a temperature of from about 50° C. to about 150° C. in substantially anhydrous alcohol-inert diluent solution, said alcohol being primary alkanol having from 1 to 8 carbon atoms, in the presence of from about 0.0001 mole to about 0.1 mole per mole of epihalohydrin of cobalt carbonyl carbonylation catalyst and epoxyalkyltrialkylammonium halide co-catalyst, the molar ratio of said co-catalyst to said catalyst being from about 1:4 to about 8:1.

2. The process for the production of 4-chloro-3-hydroxybutyrate esters by reacting epichlorohydrin with carbon monoxide at a temperature of from about 50° C. to about 150° C. in substantially anhydrous alcohol-hydrocarbon solution, said alcohol being primary alkanol having from 1 to 8 carbon atoms, in the presence of from about 0.0001 mole to about 0.1 mole per mole of epichlorohydrin of cobalt carbonyl carbonylation catalyst and glycidyltrialkylammonium halide co-catalyst, the molar ratio of said co-catalyst to said catalyst being from about 1:4 to about 8:1.

3. The process of claim 2 wherein the alcohol is methanol.

4. The process for the production of methyl 4-chloro-3-hydroxybutyrate by reacting epichlorohydrin with carbon monoxide at a temperature from about 50° C. to about 350° C. in substantially anhydrous methanol-hydrocarbon solution in the presence of from about 0.0001 mole to about 0.1 mole per mole of epichlorohydrin of bis(tri-n-butylphosphine) dicobalt hexacarbonyl and glycidyltrimethylammonium halide, the molar ratio of said ammonium halide to said cobalt carbonyl being from about 1:4 to about 8:1.

5. The process of claim 4 wherein the glycidyltrimethyl ammonium halide is glycidyltrimethylammonium chloride.

References Cited by the Examiner
UNITED STATES PATENTS

| | | | |
|---|---|---|---|
| 2,782,226 | 2/1957 | Seon | 260—484 |
| 3,028,417 | 4/1962 | Eisenmann | 260—484 |

OTHER REFERENCES

Bird, Chem. Rev., vol. 62, pp. 283–302 (1962).

LORRAINE A. WEINBERGER, *Primary Examiner.*

LEON ZITVER, *Examiner.*

D. P. CLARKE, B. M. EISEN, A. P. HALLUIN,
*Assistant Examiners.*